Feb. 8, 1955 R. KNAPP 2,701,414
DRY SHAVING DEVICE
Filed April 24, 1952
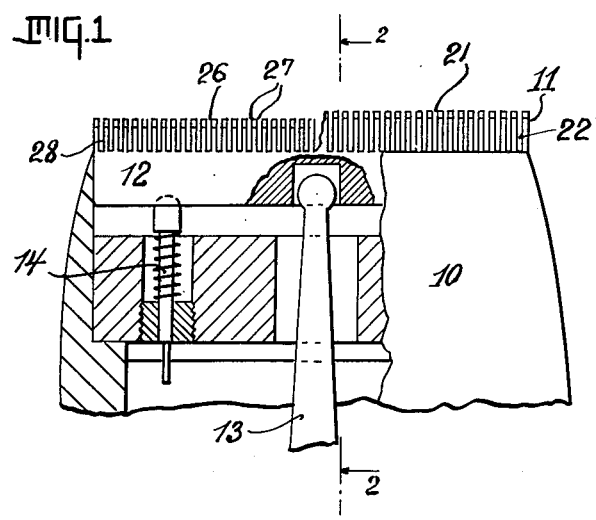
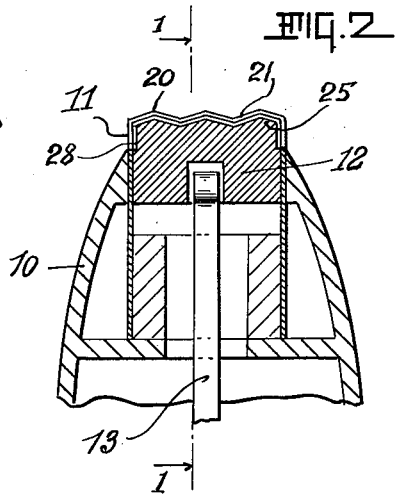
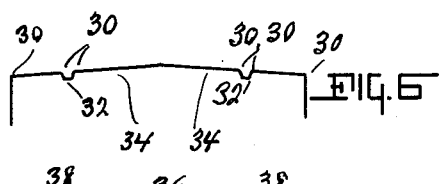
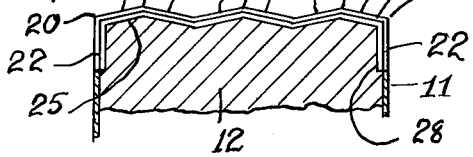
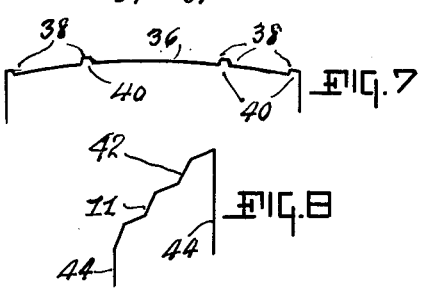
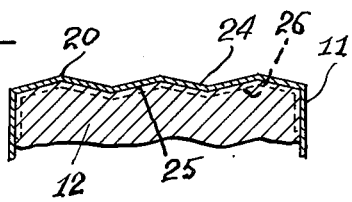
INVENTOR.
Raymond Knapp.
BY
Ivan E. G. Konigsberg
Atty.

United States Patent Office 2,701,414
Patented Feb. 8, 1955

2,701,414
DRY SHAVING DEVICE

Raymond Knapp, Forest Hills, N. Y.

Application April 24, 1952, Serial No. 284,154

1 Claim. (Cl. 30—43)

This invention relates to improvements in dry shaving implements of the type usually called electric shavers. Generally speaking all such devices include a shaving head comprising an outer slotted very thin shearing plate which contacts the skin during the shaving operation, and a cutter head which reciprocates underneath and within the shearing plate to cut the hairs which enter the slots in the plate.

The object of this invention is to provide an improved shearing plate and cutter so arranged that a close comfortable shaving may be obtained.

The objects and advantages of the proposed improvement in accordance with this invention will be more particularly pointed out in the following specification and claims read in connection with the accompanying drawing in which Fig. 1 is a side view of my improved shaver with parts broken away and parts in section on the line 1—1 of Fig. 2.

Fig. 2 is an end view of Fig. 1 with parts in section on the line 2—2 thereof and with parts broken away.

Fig. 3 is a top plan view of a portion of my improved shearing plate.

Fig. 4 is a sectional view on line 4—4 of Fig. 3 through one of the slots in the shearing plate.

Fig. 5 is a similar view on the line 5—5 of Fig. 3 through the solid part between two adjacent slots.

Figs. 6 and 7 show in outline profiles modified forms of the shearing plate.

Fig. 8 shows in outline profile a modification of the angular position of the shearing plate.

The drawing, apart from illustrating the specific embodiment of my invention, is fragmentary with respect to all the known and common features which may be found in nearly all prior shavers.

Referring to Figs. 1 and 2, the numeral 10 designates a dry shaver casing and handle of any conventionally known shape and material. In said casing there is suitably supported an immovable slotted shearing plate 11 and a slotted cutter head 12. The latter is reciprocated within and underneath the plate by means of an arm 13 which in known manner is operated by an electric motor, not shown. It is known in the art that when the motor is started, the arm 13 is caused to vibrate or oscillate to operate the cutter. The latter is maintained in operative relation to the shearing plate by spring pressed pins 14. It is not believed that any further illustration or description is needed in order to fully understand this invention.

One particular object of this invention is to provide an improved shearing plate with a corresponding cutter head whereby a more close comfortable shaving may be obtained than is possible with prior devices. This object is accomplished by providing a shearing plate so that it no longer presents a plane skin abutting surface, but on the contrary is so formed that some portions of the skin abutting area are angularly inclined with respect to the plane surface of the skin, and other intermediary portions are angularly inclined in the opposite direction to the surface of the skin. By angularly inclining the portions of the shearing plate there is provided a plurality of shearing edges in a single unitary plate construction and these edges serve to raise the hair which enter the slots in the plate.

The shearing plate 11 is of substantially inverted U-form with a skin contacting portion between the two leg portions. The face or skin contacting portion is shaped to provide portions or areas 14, 15 and 16 inclined downwardly in one direction with the intermediary portions 17, 18 and 19 angularly inclined in the opposite direction. By this formation there is provided a plurality of hair pick up or shearing edges 20, 20. Extending across the plate slots 21, 21 are provided which are unobstructed and continuous from side to side as shown. The slots terminate in shorter slots 22 in the sides of the plate. The solid portions or strips between the slots are marked 24.

The upper surface of the cutter head 12 is shaped to correspond with the formation of the shearing plate. The cutter head has inclined faces 25 which abut and move along the portions 14—19 of the shearing plate as shown in Figs. 1, 4 and 5. The cutter head is slotted as at 26 to provide cutting edges 27. The slots in the cutter head also extend down the sides thereof as shown at 28.

The shaving device according to this invention provides a plurality of shearing edges extending in parallel relation across the plate with continuous unobstructed slots extending clear across the plate at a right angle to the shearing edges. This construction has the advantage that as the shaver is moved over the face in opposite directions, the skin, being thereby depressed or formed into folds or ridges, will closely contact the inclined surface portions of the shearing plate between the shearing edges and whereby the hair is caught and enter the long slots and is cut off. With shorter or interrupted slots some hair may not be caught and cut off except by repeated applications of the shaver.

The shearing edges 20 function as edge members in picking up and raising the hair. Inasmuch as these edges are not continuous but formed merely by the high points of the plate between the slots, the shearing edges do not scrape or injure the skin.

The cutter of course is operated in the known manner, the cutting edges 27 passing across the slots in the shearing plate to cut off the hair. The angle of inclination of the surface areas of the shearing plate is not critical except to provided shearing edges raised above the plane surface of the plate with depressions between two adjacent shearing edges to form skin contacting plate surfaces during the movement of the shaver in the process of shaving. Another advantage is that it is not necessary to hold the shaver at any particular angle with relation to the face such as is the case with some prior shavers.

Fig. 6 shows a shearing plate in which a plurality of shearing edges 30, 30 are formed by providing the plate with depressed channels 32, 32 and the plate itself is formed with inclined surface areas 34, 34.

Fig. 7 shows a shearing plate having a curved surface 36. Shearing edges 38, 38 are formed by upwardly bent channels 40, 40.

Fig. 8 shows a shearing plate 11 with a skin contacting surface 42 positioned at an angle with respect to the sides 44, 44 of the inverted U-plate.

The three Figures 6, 7 and 8 shows the solid portions of the shearing plates between adjacent slots, it being understood that in all other respects, except as noted, the shearing plates in these figures correspond in construction to the shearing plate 11 in Figs. 1 and 2. Likewise, each of the shearing plates has a cooperating cutting head, the upper surface of which is shaped to correspond as will be understood.

The invention is susceptible of changes and modifications and I claim all such changes and modifications as come within the scope of the appended claim.

I claim:

In a dry shaver, an elongated hair clipping head comprising an outer shearing plate of substantially U-formation having opposed leg portions joined by a slightly curved transverse skin contacting portion, a plurality of parallel outwardly bent channels in said skin contacting portion extending lengthwise thereof, there being one such channel positioned at each side edge of said skin contacting portion and two such other channels positioned therein in spaced relation to said edge channels, the distance between the said two other channels being greater than the distance between each of them and the adjacent edge channel, each of said outwardly bent channels providing two shearing edges located outwardly of the surface of said skin contacting portion, said plate having uninterrupted continuous slots extending across said skin contacting portion and a distance down in each of said leg portions and a cooperating shearing member having teeth seated against the inner surface of the said skin contacting portion.

References Cited in the file of this patent

UNITED STATES PATENTS

| | | |
|---|---|---|
| 2,105,223 | Nicholl | Jan. 11, 1938 |
| 2,266,884 | Martin | Dec. 23, 1941 |
| 2,344,360 | Loinaz | Mar. 14, 1944 |

FOREIGN PATENTS

| | | |
|---|---|---|
| 784,482 | France | Apr. 29, 1935 |